ion No. 62/157,392, filed on May
United States Patent
Roa et al.

(10) Patent No.: US 12,541,788 B1
(45) Date of Patent: Feb. 3, 2026

(54) METHOD, SYSTEM, AND COMPUTER-READABLE STORAGE MEDIUM FOR PRODUCT RECOMMENDATIONS USING THREE-DIMENSIONAL MODELS FROM BODY SCANS

(71) Applicant: Centric Software, Inc., Campbell, CA (US)

(72) Inventors: Humberto Roa, Bainbridge Island, WA (US); Ronald S. Watson, Los Gatos, CA (US); Ravi Rangan, Bothell, WA (US); Chris Groves, Los Gatos, CA (US); Bandel Carano, Palo Alto, CA (US)

(73) Assignee: Centric Software, Inc., Campbell, CA (US)

( * ) Notice: Subject to any disclaimer, the term of this patent is extended or adjusted under 35 U.S.C. 154(b) by 66 days.

(21) Appl. No.: 18/735,121

(22) Filed: Jun. 5, 2024

Related U.S. Application Data

(63) Continuation of application No. 15/147,820, filed on May 5, 2016, now Pat. No. 12,008,624.

(60) Provisional applicat5, 2015, provisional application No. 62/157,378, filed
(Continued)

(51) Int. Cl.
*G06Q 30/06* (2023.01)
*G06F 3/0486* (2013.01)
*G06F 3/0488* (2022.01)
*G06N 5/04* (2023.01)
(Continued)

(52) U.S. Cl.
CPC ....... *G06Q 30/0631* (2013.01); *G06F 3/0486* (2013.01); *G06F 3/0488* (2013.01); *G06N 5/04* (2013.01); *G06Q 10/0631* (2013.01); *G06Q 30/0643* (2013.01)

(58) Field of Classification Search
CPC .......................... G06Q 30/06; G06Q 30/0631
See application file for complete search history.

(56) References Cited

U.S. PATENT DOCUMENTS

| 2005/0022708 | A1* | 2/2005 | Lee | G06Q 10/087 112/186 |
| 2010/0111370 | A1* | 5/2010 | Black | G06F 18/2321 705/26.1 |
| 2012/0086783 | A1 | 4/2012 | Sareen | |

FOREIGN PATENT DOCUMENTS

WO WO-2009090391 A1 * 7/2009 ............. G06Q 30/06

OTHER PUBLICATIONS

Vardy, J. (Oct. 26, 2000). I had my body scanned and all I got was this lousy underwear: Land's end promotion: Body measurements data lost when the lights went out: [national edition 1]. National Post Retrieved from https://dialog.proquest.com/professional/docview/329695757?accountid=131444.*
(Continued)

*Primary Examiner* — Jeffrey A. Smith
*Assistant Examiner* — Jennifer V Lee
(74) *Attorney, Agent, or Firm* — Aka Chan LLP

(57) ABSTRACT

A system includes software that allows users to use one or more sources of sizing information to make purchasing decisions. The system uses three-dimensional (or 3D) scans of customers to make apparel recommendations. The 3D scans are compared to sizing information in the system, to determine which products are most suitable for the customer. Sizing information the system can use are information from manufacturers as well as sizing feedback from previous customers.

20 Claims, 6 Drawing Sheets

Related U.S. Application Data on May 5, 2015, provisional application No. 62/157,384, filed on May 5, 2015.

(51) Int. Cl.
*G06Q 10/0631* (2023.01)
*G06Q 30/0601* (2023.01)

(56) References Cited

OTHER PUBLICATIONS

Vardy, J. (Oct. 26, 2000). I had my body scanned and all I got was this lousy underwear: Land's end promotion: Body measurements data lost when the lights went out: [national edition 1]. National Post Retrieved from https:I/dialog.proquest.com/professional/docview/329695757?accountid=131444.

* cited by examiner

METHOD, SYSTEM, AND COMPUTER-READABLE STORAGE MEDIUM FOR PRODUCT RECOMMENDATIONS USING THREE-DIMENSIONAL MODELS FROM BODY SCANS

CROSS-REFERENCE TO RELATED APPLICATIONS

This patent application is a continuation of U.S. patent application Ser. No. 15/147,820, filed May 5, 2016, issued as U.S. Pat. No. 12,008,624 on Jun. 11, 2024, which claims the benefit of U.S. patent applications 62/157,378, 62/157,384, and 62/157,392, filed May 5, 2015. These applications are incorporated by reference along with all other references cited in this application.

BACKGROUND OF THE INVENTION

This invention relates to the field of garments and more specifically to helping people to find the right fit for their clothing and accessories.

With the advent of the internet, online shopping has displaced some purchases that used to be made by consumers in traditional brick and mortar stores. Online shopping allows users easy access to a variety of products and to compare prices for different products, more easily than was possible before. However, even with the added convenience of online shopping, there are drawbacks to shopping on the internet.

In particular, many people find purchasing some things, such as clothing, on the internet unsettling. For one thing, since clothing is highly dependent on a person's unique style, fitting, and other requirements, it is difficult to find the right piece of clothing. For example, when a customer buys a product, they use a product size as one of the guides to select a product that will fit well. These conform to different sizing categorizations such as a numerical size or a generalized size (e.g., small, medium, large). These sizing categorizations may work for many, but for others it will fall short. Many times, people find themselves in between different sizes or that while the clothing is right in certain areas, is too loose or tight in others.

Therefore, there is a need for improved product fittings and sizing, especially techniques allowing consumers to choose their best sizes.

BRIEF SUMMARY OF THE INVENTION

In an implementation, a system includes software that allows users to use one or more sources of sizing information to make purchasing decisions. The system uses three-dimensional (or 3D) scans of customers to make apparel recommendations. The 3D scans are compared to sizing information in the system, to determine which products are most suitable for the customer. Sizing information the system can use are information from manufacturers as well as sizing feedback from previous customers.

In an implementation, a method includes: providing first three-dimensional model based on a scan of a body of a customer; comparing the first three-dimensional model against a number of preexisting three-dimensional models; and selecting one of the preexisting three-dimensional models that is a closest match to the first three-dimensional model as a selected three-dimensional model.

The method further includes: using the selected three-dimensional model to generate a list of sizes; using the list of sizes to generate a list of products; and displaying the list of products to the customer.

Other objects, features, and advantages of the invention will become apparent upon consideration of the following detailed description and the accompanying drawings, in which like reference designations represent like features throughout the figures.

DETAILED DESCRIPTION OF THE INVENTION

When a customer buys a product, they use a product size as one of the guides to select a product that will fit well. This product size represents a configuration of separate dimension values that were selected during the development of the product. These dimensions are known as points of measure to a product developer.

During product development, a product design begins with initial point of measure values for each size of the product, and these values are used to make the initial product prototypes. To validate the point of measure values, a person known as a fit model participates in a fit evaluation session with another person known as a fit technician. The fit model wears the prototype, and the fit technician makes updates point of measure values in a document known as a size chart. Through multiple prototype iterations, the fit technician finalizes the values of the points of measure on the size charts to make the product fit well for people with a body shape that is similar to the fit models body shape. After producing the product using the finalized points of measure, the product is manufactured and sold.

In an implementation, the system uses points of measure for different products to recommend products to customers. As discussed above, these points of measure are used by product developers, to finalize the sizing of the product. So, instead of going by the sizing determined using the size charts, the system can direct use the points of measure for a product to make its recommendations.

In an implementation, the system allows customer sizing feedback. After the customer buys a product, they can submit feedback regarding the purchase that can include comments and a rating. Customers that are browsing products to purchase can use this feedback to guide their purchase decision. The system can also include this information when making its product recommendations.

Figure 1:
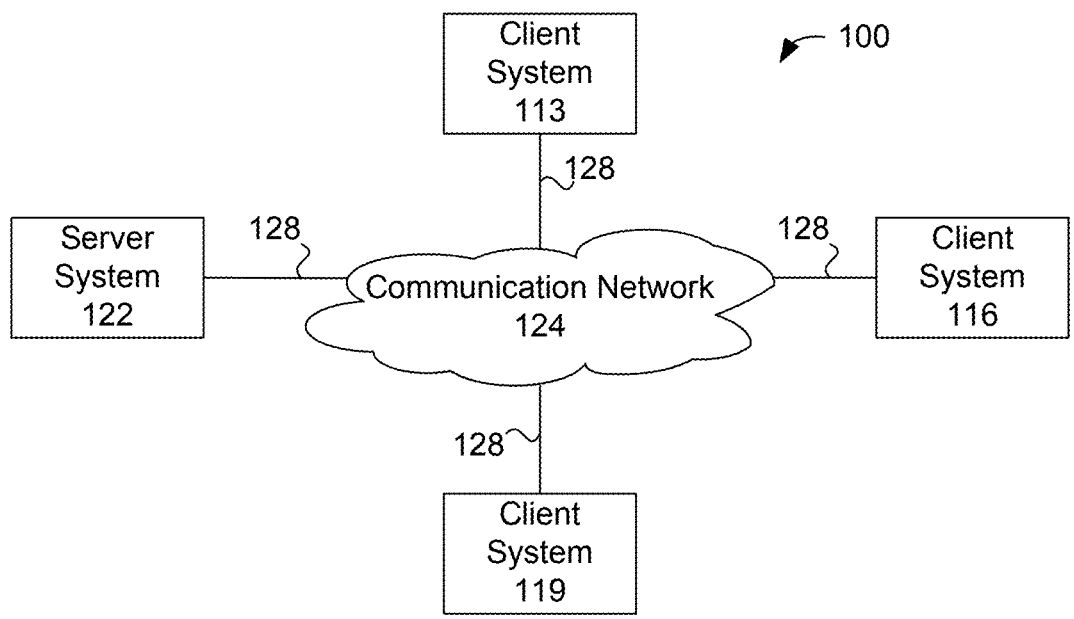
FIG. 1 shows a simplified block diagram of a client-server system and network in which an embodiment of the invention may be implemented.

FIG. 1 is a simplified block diagram of a distributed computer network 100 incorporating an embodiment of the present invention. Computer network 100 includes a number of client systems 113, 116, and 119, and a server system 122 coupled to a communication network 124 via a plurality of communication links 128. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Communication links 128 may be DSL, Cable, Ethernet or other hardwire links, passive or active optical links, 3G, 3.5G, 4G and other mobility, satellite or other wireless communications links, wave propagation links, or any other mechanisms for communication of information.

Various communication protocols may be used to facilitate communication between the various systems shown in FIG. 1. These communication protocols may include VLAN, MPLS, TCP/IP, Tunneling, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment incorporating the present invention and does not limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as both as a client or a server depending on whether the computer system is requesting or providing information. Additionally, although aspects of the invention has been described using a client-server environment, it should be apparent that the invention may also be embodied in a stand-alone computer system.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

Client systems 113, 116, and 119 enable users to access and query information stored by server system 122. In a specific embodiment, the client systems can run as a stand-alone application such as a desktop application or mobile smartphone or tablet application. In another embodiment, a "web browser" application executing on a client system enables users to select, access, retrieve, or query information stored by server system 122. Examples of web browsers include the Internet Explorer browser program provided by Microsoft Corporation, Firefox browser provided by Mozilla, Chrome browser provided by Google, Safari browser provided by Apple, and others.

In a client-server environment, some resources (e.g., files, music, video, or data) are stored at the client while others are stored or delivered from elsewhere in the network, such as a server, and accessible via the network (e.g., the Internet). Therefore, the user's data can be stored in the network or "cloud." For example, the user can work on documents on a client device that are stored remotely on the cloud (e.g., server). Data on the client device can be synchronized with the cloud.

Figure 2:
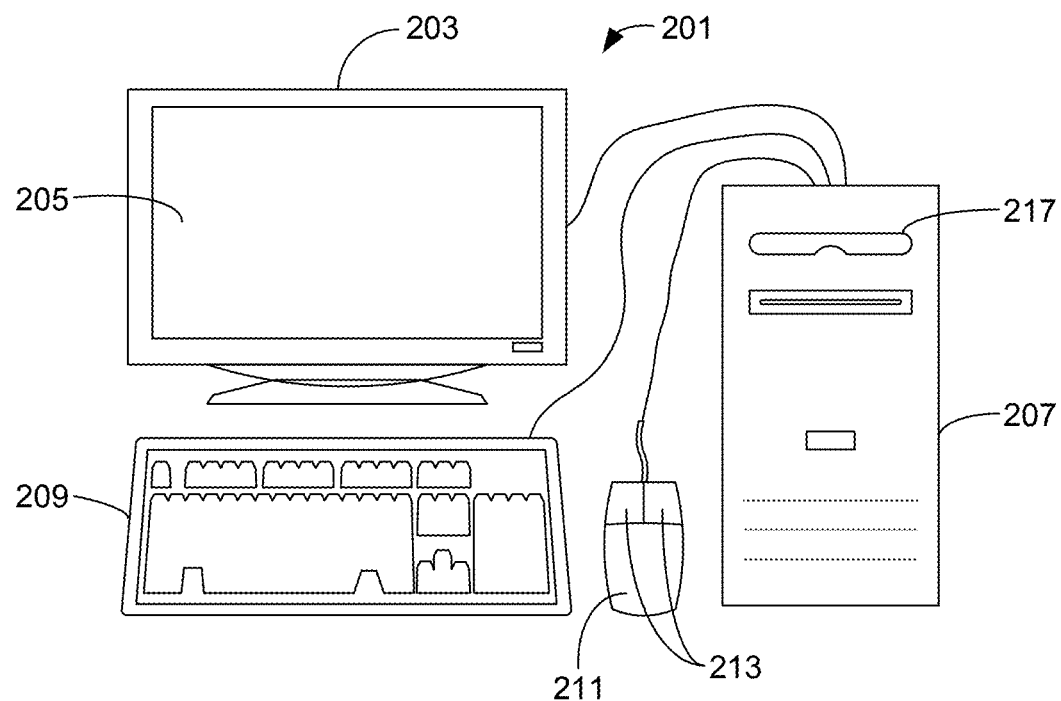
FIG. 2 shows a more detailed diagram of an exemplary client or computer which may be used in an implementation of the invention.

FIG. 2 shows an exemplary client or server system of the present invention. In an embodiment, a user interfaces with the system through a computer workstation system, such as shown in FIG. 2. FIG. 2 shows a computer system 201 that includes a monitor 203, screen 205, enclosure 207 (may also be referred to as a system unit, cabinet, or case), keyboard or other human input device 209, and mouse or other pointing device 211. Mouse 211 may have one or more buttons such as mouse buttons 213.

It should be understood that the present invention is not limited any computing device in a specific form factor (e.g., desktop computer form factor), but can include all types of computing devices in various form factors. A user can interface with any computing device, including smartphones, personal computers, laptops, electronic tablet devices, global positioning system (GPS) receivers, portable media players, personal digital assistants (PDAs), other network access devices, and other processing devices capable of receiving or transmitting data.

For example, in a specific implementation, the client device can be a smartphone or tablet device, such as the Apple iPhone (e.g., Apple iphone 5), Apple iPad (e.g., Apple iPad or Apple iPad mini), Apple iPod (e.g, Apple ipod Touch), Samsung Galaxy product (e.g., Galaxy S series product or Galaxy Note series product), Google Nexus devices (e.g., Google Nexus 4, Google Nexus 7, or Google Nexus 10), and Microsoft devices (e.g., Microsoft Surface tablet). Typically, a smartphone includes a telephony portion (and associated radios) and a computer portion, which are accessible via a touch screen display.

There is nonvolatile memory to store data of the telephone portion (e.g., contacts and phone numbers) and the computer portion (e.g., application programs including a browser, pictures, games, videos, and music). The smartphone typically includes a camera (e.g., front facing camera or rear camera, or both) for taking pictures and video. For example, a smartphone or tablet can be used to take live video that can be streamed to one or more other devices.

Enclosure 207 houses familiar computer components, some of which are not shown, such as a processor, memory, mass storage devices 217, and the like. Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive or solid state drive (SSD)), battery-backed-up volatile memory, tape storage, reader, and other similar media, and combinations of these.

A computer-implemented or computer-executable version or computer program product of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software of the present invention may also be stored or reside on mass storage device 217 (e.g., hard disk, magnetic disk, tape, or CD-ROM). As a further example, code of the invention may be transmitted via wires, radio waves, or through a network such as the Internet.

Figure 3:
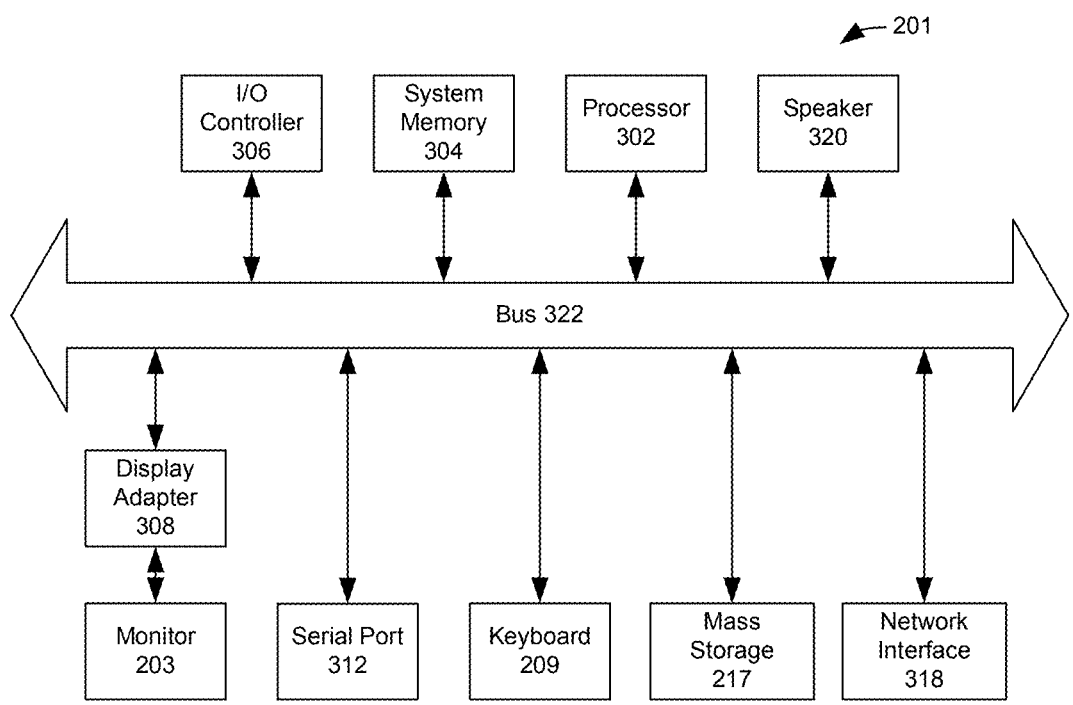
FIG. 3 shows a system block diagram of a client computer system used to execute an application program according to the invention.

FIG. 3 shows a system block diagram of computer system 201 used to execute the software of the present invention. As in FIG. 2, computer system 201 includes monitor 203, keyboard 209, and mass storage devices 217. Computer system 501 further includes subsystems such as central processor 302, system memory 304, input/output (I/O) controller 306, display adapter 308, serial or universal serial bus (USB) port 312, network interface 318, and speaker 320. The invention may also be used with computer systems with additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C#, Pascal, Fortran, Perl, Matlab (from MathWorks, www.mathworks.com), SAS, SPSS, JavaScript, AJAX, Java, Python, Erlang, and Ruby on Rails. The computer software product may be an independent application with data input and data display modules. Alternatively, the computer software products may be classes that may be instantiated as distributed objects. The computer software products may also be component software such as Java Beans (from Oracle Corporation) or Enterprise Java Beans (EJB from Oracle Corporation).

An operating system for the system may be one of the Microsoft Windows® family of systems (e.g., Windows 95, 98, Me, Windows NT, Windows 2000, Windows XP, Windows XP x64 Edition, Windows Vista, Windows 7, Windows 8, Windows CE, Windows Mobile, Windows RT), Symbian OS, Tizen, Linux, HP-UX, UNIX, Sun OS, Solaris, Mac OS X, Apple IOS, Android, Alpha OS, AIX, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.1 lad, just to name a few examples), near field communication (NFC), radio-frequency identification (RFID), mobile or cellular wireless (e.g., 2G, 3G, 4G, 3GPP LTE, WiMAX, LTE, LTE Advanced, Flash-OFDM, HIPERMAN, iBurst, EDGE Evolution, UMTS, UMTS-TDD, 1×RDD, and EV-DO). For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

In other implementations, the user accesses the system through either or both of native and nonnative applications. Native applications are locally installed on the particular computing system and are specific to the operating system or one or more hardware devices of that computing system, or a combination of these. These applications (which are sometimes also referred to as "apps") can be updated (e.g., periodically) via a direct internet upgrade patching mechanism or through an applications store (e.g., Apple iTunes and App store, Google Play store, and Windows Phone App store).

The system can run in platform-independent, nonnative applications. For example, client can access the system through a web application from one or more servers using a network connection with the server or servers and load the web application in a web browser. For example, a web application can be downloaded from an application server over the Internet by a web browser. Nonnative applications can also be obtained from other sources, such as a disk.

Some specific flows for determining a technique of the invention are presented in this application, but it should be understood that the invention is not limited to the specific flows and steps presented. A flow of the invention may have additional steps (not necessarily described in this application), different steps which replace some of the steps presented, fewer steps or a subset of the steps presented, or steps in a different order than presented, or any combination of these. Further, the steps in other implementations of the invention may not be exactly the same as the steps presented and may be modified or altered as appropriate for a particular application or based on the data.

In an implementation, the system includes one or more of the following components:

(1) A device with the capability to make 3D scans of a person, and that can save the 3D scan as a 3D model. Some examples of compatible devices include smart phones, cameras, digitizers, and other devices. For example, the devices can save the 3D scan as one or more image files, text-based dimensions, computer-aided design file, or other suitable formats.

(2) A matching service that can determine the similarity between 3D models.

(3) A recommendation service that can use 3D model similarities to identify products.

(4) A customer management service that can store 3D models of customer body scans, and that can associate the 3D models to customer product feedback. This information can be used to refine recommendations, based on both points of measure information and 3D model information.

(5) A product lifecycle management system that can store 3D models of fit model body scans, and that can associate the 3D models to fit evaluation sessions.

Figure 4:
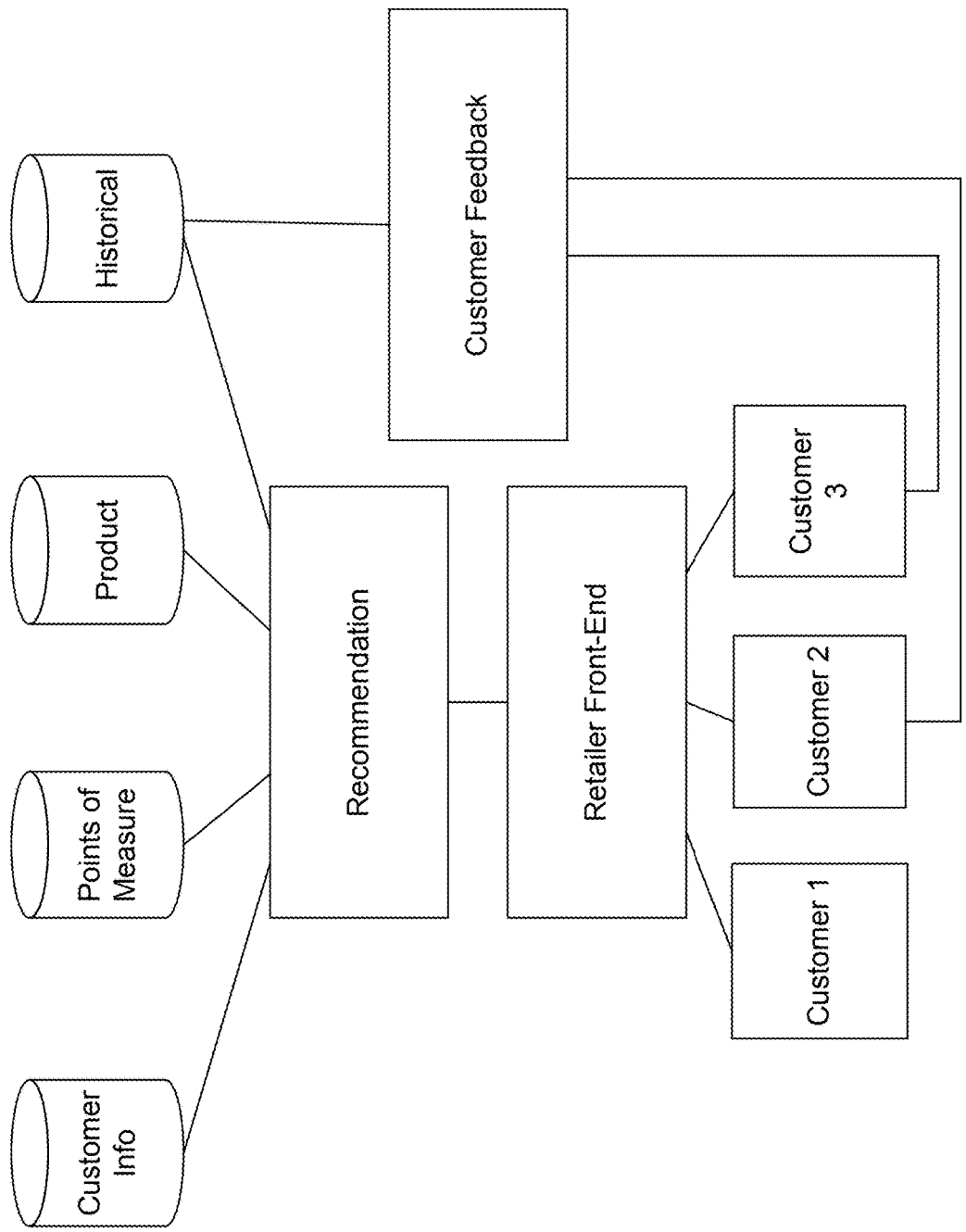
FIG. 4 shows a block diagram of a system including a recommendation module for a product recommendation system.

FIG. 4 shows a block diagram of a system including a recommendation module for a product recommendation system. Customers 1, 2, and 3 are connected to a retailer front-end using their devices. When the customers are viewing the retailer's products, a recommendation module determines what products to show the customers, such as suggesting what the best fitting items are. The recommendation module is coupled to various databases. A customer information database includes information on the customer's such as their e-mail, previous purchases, billing and shipping addresses, and other information. The customer information database also includes information on three-dimensional scans taken of customers. A product database includes information on what is available from the retailer. This can be updated with real-time inventory to alert customers what is available for shipping immediately. Products in the products database are cross-referenced with points of measure information. The points of measure information on products are supplied by manufacturers or taken by the retailer. A historical database is used by the recommendation module containing reviews made by other customers on what they thought about the fit of purchased products. These reviews are generally provided to the system after the user has purchased the product and tried them in person. A customer feedback module is responsible for gathering customer feedback on products (e.g., sizing information).

Figure 5:
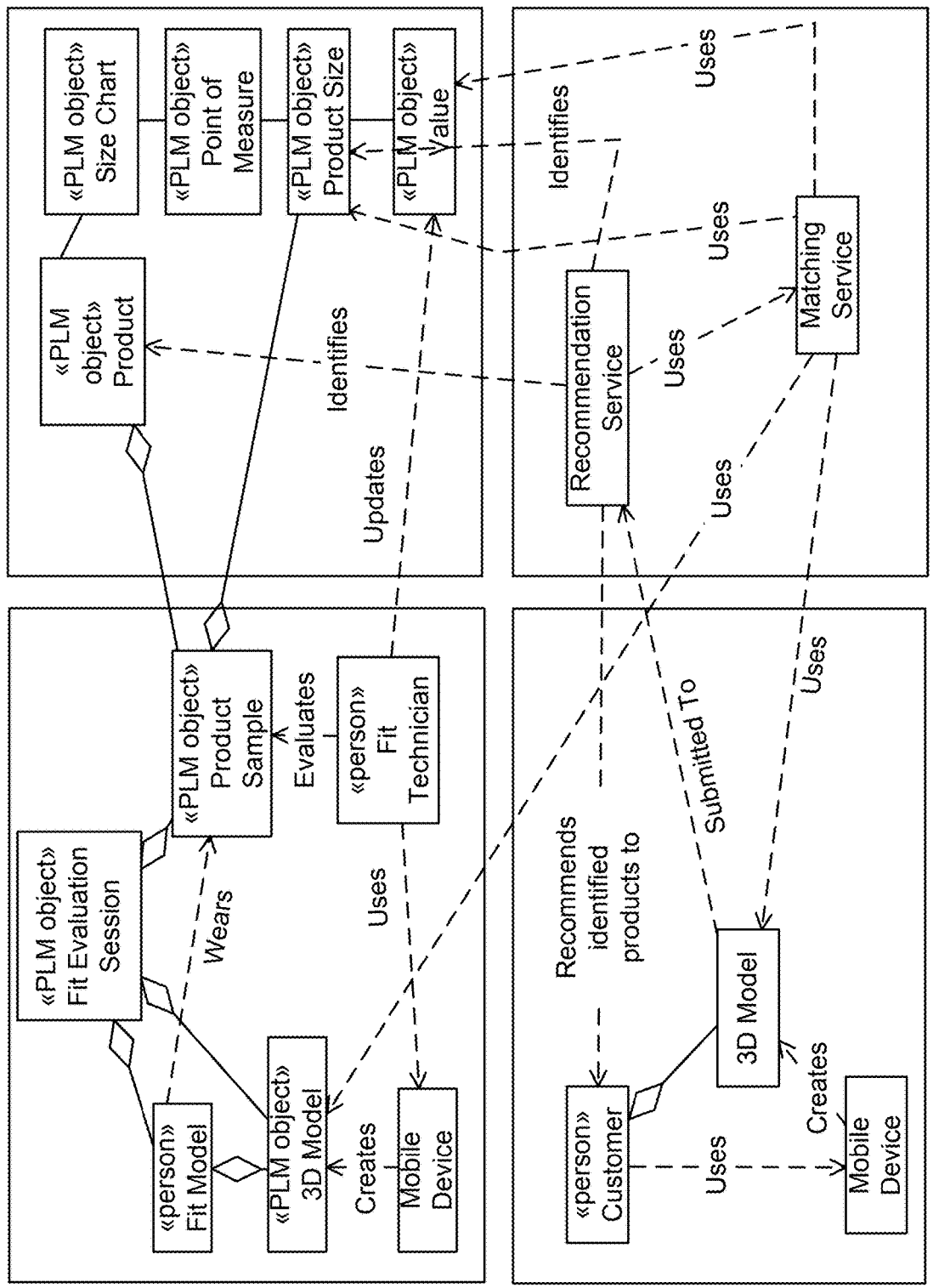
FIG. 5 shows an example of how information is used in a recommendation feature of the system.

FIG. 5 shows an example of how information is used in a recommendation feature of the system.

Figure 6A:
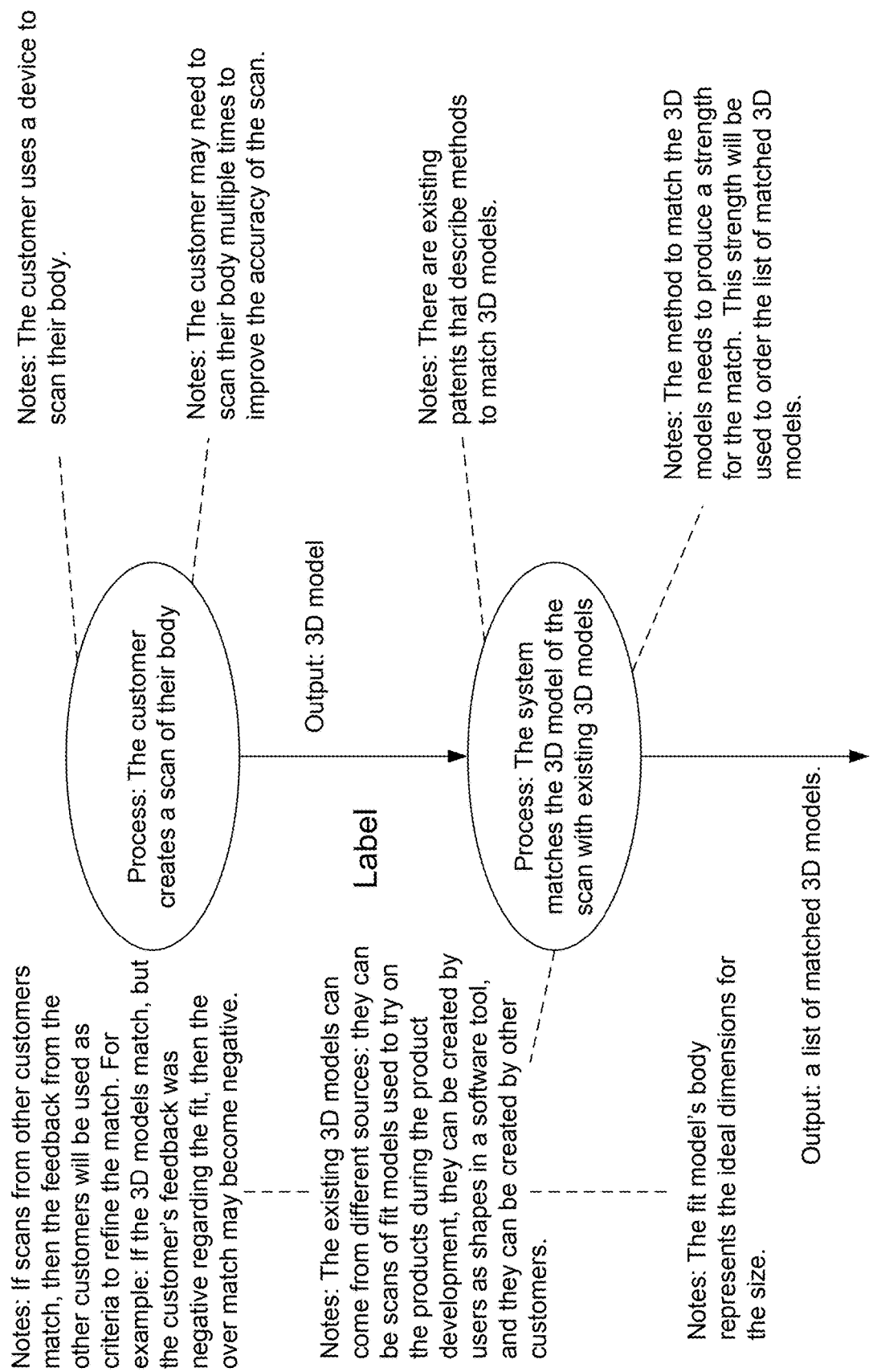
FIGS. 6A-6B show a flow for using a three-dimensional model of a person's body to make recommendations for sizing of clothing.
Figure 6B:
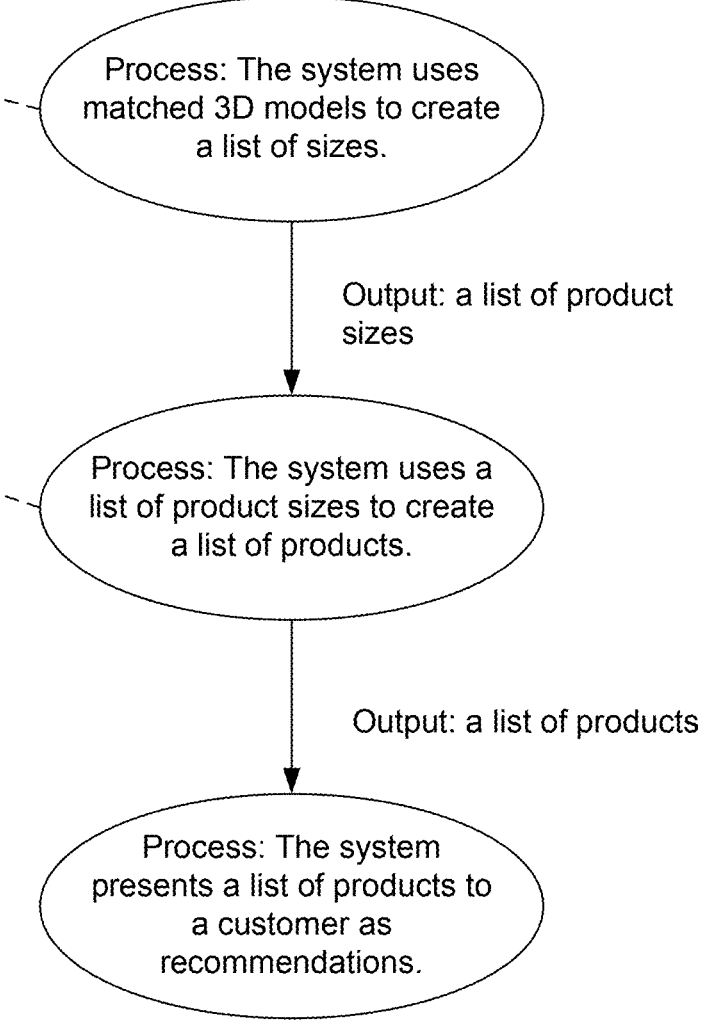

FIGS. 6A-6B show a flow for using a three-dimensional model of a person's body to make recommendations for sizing of clothing.

In an implementation, a system or technique assists users or customers in selecting products using an optimum product size. Various aspects or concepts can include the following numbered items. Some of the numbered items provide additional details, variations, or specificity to an aspect or concept that is identified by number within brackets.

1. A method for assisting a customer in selecting products.
2. [1] Providing a handheld device to scan the customer's body to create a 3D model.
3. [1] Scanning the customer's body with the device.
4. [1] Matching the 3D model created with the customer's body scan with a set of existing 3D models.
5. [1] Generating a list of sizes using the matched 3D models.
6. [1] Generating a list of products using the generated list of sizes.
7. [1] Presenting the list of products to the customer.
8. [2] The 3D model can be a combination of multiple scans to improve accuracy of the scanned shape.
9. [4] The set of existing 3D models can include 3D models created during a product development with scans of bodies that have the ideal dimensions for particular sizes.
10. [4] The set of existing 3D models can include 3D models that were created in a system that a user can use to create a body shape with the ideal dimensions for particular sizes.
11. [4] The set of existing 3D models can include 3D models created with scans provided by other customers that have tried on a product for a particular size and who have left feedback on the fit of the size.
12. [4] A means to create a list of 3D models that match a particular 3D model.
13. [4] A means to order a list of matched 3D models using the strength of the match.
14. [5] A means to select the size that is related 3D model.
15. [5] A means to order a list of sizes using the strength of the match of the related 3D models.
16. [6] A means to create a list of products using a list of sizes.
17. [16] The products will be selected from a set of products using the sizes the product is offered in.
18. [16] A means to order a list of products using a list of sizes.
19. [7] A means to present a list of products to a customer.
20. [11] The feedback from other customers will be used as criteria in the matching process.
21. [20] If and existing customer's scan matches the scan submitted but the current customer, but the existing customer's feedback was negative, then the scan may not be considered a match.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method comprising:

retrieving, by one or more processors, points of measure values, wherein the points of measure values were used to create a prototype of a particular product;

updating, by one or more processors, the points of measure values based on evaluation data corresponding to adjustments determined from fitting the prototype of the particular product on a fit model;

storing, by one or more processors, a three-dimensional model of a body scan of the fit model as a preexisting three-dimensional model;

scanning, by a handheld device, a body of a customer;

creating, by one or more processors, a first three-dimensional model based on a combination of multiple scans by the handheld device of the body of the customer;

comparing, by one or more processors, the first three-dimensional model against a plurality of preexisting three-dimensional models;

selecting, by one or more processors, the preexisting three-dimensional model from the plurality of preexisting three-dimensional models based on a strength of a match between the preexisting three-dimensional model and the first three-dimensional model;
generating, by one or more processors, a list of sizes using the selected preexisting three-dimensional model;
generating, by one or more processors, a list of products using the generated list of sizes, the generating comprising:
  determining, by one or more processors, whether each particular product in a set of products is available based on real-time inventory;
  receiving, by one or more processors, for each particular product in the set of products, the updated points of measure values, wherein the updated points of measure values were used to create the particular product;
  determining, by one or more processors, based on the updated points of measure values and the generated list of sizes generated using the selected preexisting three-dimensional model, whether the particular product corresponds to the generated list of sizes; and
  based on the determination that the particular product corresponds to the generated list of sizes, generating, by one or more processors, the list of products including the particular product; and
displaying, by one or more processors, the list of products to the customer.

2. The method of claim 1 wherein the updated points of measure values that were used to create the particular product comprise dimensional values selected for manufacture of the particular product.

3. The method of claim 1 wherein the updated points of measure values that were used to create the particular product is different than a size measurement using a sizing chart.

4. The method of claim 1 wherein the generated list of sizes includes two or more sizes that correspond to the selected preexisting three-dimensional model.

5. The method of claim 1 wherein the list of products is based at least in part on feedback received from another customer.

6. The method of claim 1 wherein the generated list of sizes is based at least in part on manufacturer-provided information.

7. The method of claim 1 wherein the scans of the body of the customer are captured using a smart phone camera.

8. The method of claim 1 wherein the scans of the body of the customer are stored in a computer-aided design file format.

9. The method of claim 1 wherein the list of products comprises an indication of an availability of the particular product at an online retailer.

10. The method of claim 1 wherein the selected preexisting three-dimensional model corresponds to more than one apparel type.

11. The method of claim 1 wherein the selected preexisting three-dimensional model corresponds to a first size for a first apparel type and a second size for a second apparel type.

12. The method of claim 1 wherein the scans of the body of the customer comprise more than one image file.

13. The method of claim 1 wherein the scans of the body of the customer comprise text-based dimensions.

14. The method of claim 1 comprising determining, based on another customer indicating that the particular product is improperly sized, not to include the particular product in the list of products.

15. A system comprising:
a handheld device configured to scan a body of a customer;
one or more processors; and
a memory storing instructions, that when executed by the one or more processors, configure the one or more processors to perform operations comprising:
  retrieving points of measure values, wherein the points of measure values were used to create a prototype of a particular product;
  updating the points of measure values based on evaluation data corresponding to adjustments determined from fitting the prototype of the particular product on a fit model;
  storing a three-dimensional model of a body scan of the fit model as a preexisting three-dimensional model;
  creating a first three-dimensional model based on a combination of multiple scans by the handheld device of the body of the customer;
  comparing the first three-dimensional model against a plurality of preexisting three-dimensional models;
  selecting the preexisting three-dimensional model from the plurality of preexisting three-dimensional models based on a strength of a match between the preexisting three-dimensional model and the first three-dimensional model;
  generating a list of sizes using the selected preexisting three-dimensional model;
  generating a list of products using the generated list of sizes, the generating comprising:
    determining whether each particular product in a set of products is available based on real-time inventory;
    receiving, for each particular product in the set of products, the updated points of measure values, wherein the updated points of measure values were used to create the particular product;
    determining, based on the updated points of measure values and the generated list of sizes generated using the selected preexisting three-dimensional model, whether the particular product corresponds to the generated list of sizes; and
    based on the determination that the particular product corresponds to the generated list of sizes, generating the list of products including the particular product; and
  displaying the list of products to the customer.

16. The computer program product of claim 15 wherein the scans of the body of the customer are captured using a smart phone camera.

17. The computer program product of claim 15 wherein the list of products comprises an indication of an availability of the particular product at an online retailer.

18. A non-transitory computer-readable storage medium storing instructions that, when executed by one or more processors, cause the one or more processors to perform operations comprising:
retrieve points of measure values, wherein the points of measure values were used to create a prototype of a particular product;
update the points of measure values based on evaluation data corresponding to adjustments determined from fitting the prototype of the particular product on a fit model;
store a three-dimensional model of a body scan of the fit model as a preexisting three-dimensional model;
scan a body of a customer by a handheld device;

create a first three-dimensional model based on a combination of multiple scans by the handheld device of the body of the customer;
compare the first three-dimensional model against a plurality of preexisting three-dimensional models;
select the preexisting three-dimensional model from the plurality of preexisting three-dimensional models based on a strength of a match between the preexisting three-dimensional model and the first three-dimensional model;
generate a list of sizes using the selected preexisting three-dimensional model;
generate a list of products using the generated list of sizes, the generating comprising:
 determine whether each particular product in a set of products is available based on real-time inventory;
 receive, for each particular product in the set of products, the updated points of measure values, wherein the updated points of measure values were used to create the particular product;
 determine, based on the updated points of measure values and the generated list of sizes generated using the selected preexisting three-dimensional model, whether the particular product corresponds to the generated list of sizes; and
 based on the determination that the particular product corresponds to the generated list of sizes, generate the list of products including the particular product; and
display the list of products to the customer.

19. The computer-readable storage medium of claim 18 wherein the scans of the body of the customer are captured using a smart phone camera.

20. The computer-readable storage medium of claim 18 wherein the list of products comprises an indication of an availability of the particular product at an online retailer.

\* \* \* \* \*